E. A. CALAHAN.
Telegraphic Indicator.

Patented March 31, 1868.

Witnesses.
Geo. D. Walker
Chas. H. Smith

Inventor.
Edw. A. Calahan

E. A. CALAHAN.
Telegraphic Indicator.

Patented March 31, 1868.

Witnesses.
Geo. D. Walker
Chas. H. Smith

Inventor.
Edw. A. Calahan

United States Patent Office.

EDWARD A. CALAHAN, OF BROOKLYN, NEW YORK.

Letters Patent No. 76,157, dated March 31, 1868; antedated March 23, 1868.

---

IMPROVEMENT IN TELEGRAPHIC INDICATORS.

---

The Schedule referred to in these Letters Patent and making part of the same.

---

TO ALL WHOM IT MAY CONCERN:

Be it known that I, EDWARD A. CALAHAN, of Brooklyn, in the county of Kings, and State of New York, have invented, made, and applied to use, a certain new and useful Improvement in Telegraphic Indicators for the prices of gold, stocks, &c.; and I do hereby declare the following to be a full, clear, and exact description of the said invention, reference being had to the annexed drawing, making part of this specification, wherein—

Similar marks of reference denote the same parts.

Figure 1:
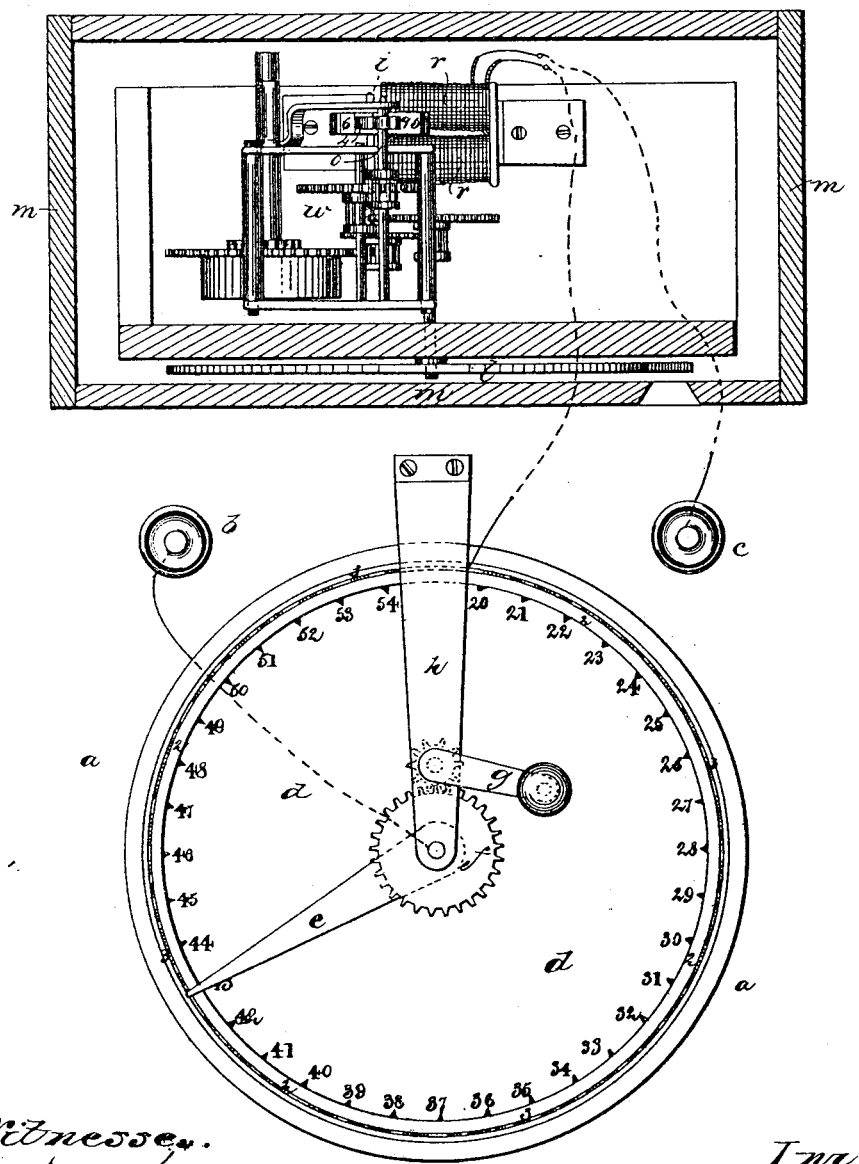
Figure 1 is a plan of the said indicator, the box enclosing the dial and clock-work being in section.

In most commercial cities a want has been experienced of a cheap and reliable indicator for telegraphing, from the centres of trade to distant business firms and operators, the fluctuations in the prices of gold, stocks, articles of merchandise, &c. Several efforts have been made to meet this want, but the machines have been costly, difficult to manage, or liable to get out of repair.

The nature of my said invention consists in a transmitting-instrument, formed as a disk, upon which are marked the signals, numbers, or words to be pointed out. Over this is an arm that makes and breaks the circuit by contact with the undulating edge of a metallic ring, and I form the receiving-instrument of a dial, corresponding to the transmitting-disk, actuated by clock-work, controlled by a peculiar let-off mechanism worked by the magnet, so that the receiving-dial or dials in a telegraphic circuit are all brought to the same indicating-point by the pulsations of electricity from one of the transmitting-instruments.

In the drawing, $a$ is a table, $b$ and $c$ the positive and negative binding-screws; $d$ is a dial, around which are a wooden flange, 2, and a metal ring, 3, the upper edge of which is undulating, and the highest points rise above and the lowest points pass below the surface of the flange 2. The number of undulations corresponds with the number of signs, numbers, figures, or names placed around the dial $d$, and the same are placed on the line of the pointer $e$ when resting on the wood or non-conducting flange 2, between but not in contact with the projecting undulations. The pointer $e$ is moved by the wheel $f$ and pinion on the axis of the crank $g$, and this is supported by the bracket $h$. The binding-screw $b$ connects with the centre of the arm or pointer $e$, and the screw $c$ connects with the ring 3 through the magnet-coil $r$.

It will now be understood that the movement of the pointer $e$ from one point of the dial to another will cause as many pulsations of electricity as there are projecting undulations of the ring 3 that are travelled over by the pointer, and that the armature $i$ of the receiving-magnets $r$ will receive the same number of vibrations.

I provide a receiving-dial, $l$, within a case, $m$, in which is an opening, through which can be seen one of the signs, figures, letters, or names on the dial $l$; and the divisions, positions of names and numbers on the dial $l$, correspond to those on the dial of the transmitting-instrument. The dial $l$ is on one of the shafts of a clock-movement $w$, actuated by a spring or weight, and $o$ is the escapement-shaft, the trains of wheels being so proportioned that one revolution of the shaft $o$ is given each change of the dial from one division to the next; hence I make my peculiar escapement, so that, every pulsation of the magnet, the shaft $o$ shall be allowed to revolve once, and cannot turn any more than one revolution; hence the transmitting and receiving-instruments will remain in unison, regardless of the speed of transmission or operations of the parts.

Upon the end of the shaft $o$ is the escapement-arm 4, that operates against the pallets 5 and 6 of the escapement. The lever 7 of the armature $i$ operates on this escapement in one direction, and the spring 8 in the other direction, and 9 is a counterbalance to the arm 4, but shorter.

Figure 3:
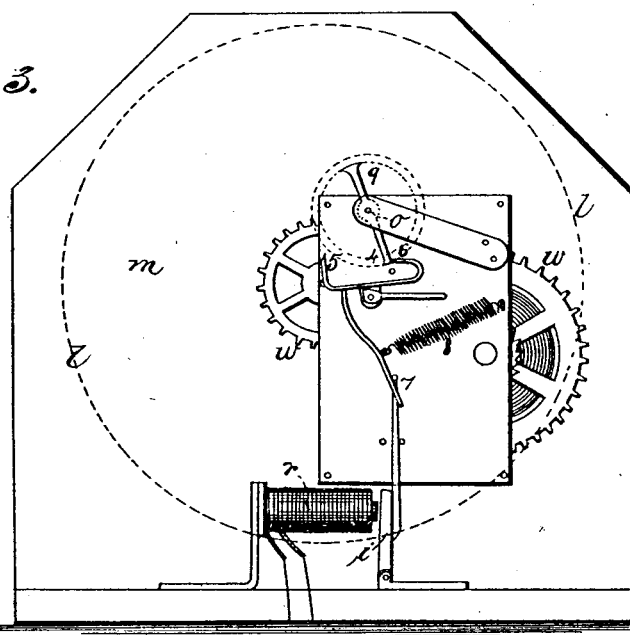
Figure 3 is an elevation of the magnet and escapement.
Figure 2:
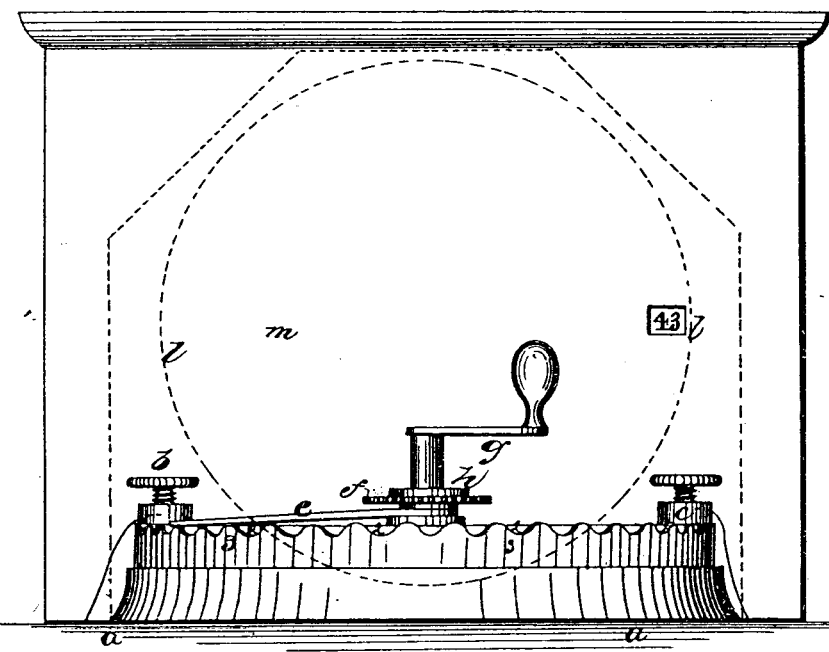
Figure 2 is an elevation of the transmitting portion of the instrument, showing also the receiving-box and exposed figure of the dial.

In the normal position of the escapement the parts are in the position shown in fig. 3, with the arm 4 against the pallet 6, but when that is moved by the magnet (incited by the electricity) the pallet 6 draws back and the arm 4 flies around, strikes the pallet 5, and holds the clock-movement and disk $l$ until the circuit is broken and the magnetism no longer is operative, and the pallet 5 is released, the arm being again arrested by the pallet 6. In this last position the receiving and transmitting-instruments indicate corresponding numbers, signs, or words.

It will be evident that the operation of this machine will be very rapid, and that there is nothing liable to derangement or injury.

Two dials may be employed, one with figures, the other with names, signs, or fractions, or the fractions and names may be so placed on the dials as to be indicated when the circuit is closed.

What I claim, and desire to secure by Letters Patent, is—

1. The transmitting-instrument, formed of a disk, in combination with the arm $e$ and undulating edge of the metallic ring, the parts being connected and operating as and for the purposes set forth.

2. The escapement and arm, constructed as specified, in combination with the armature, magnet, clockwork, and dial, as and for the purposes specified.

In witness whereof, I have hereunto set my signature, this thirtieth day of July, A. D. 1867.

EDW'D A. CALAHAN.

Witnesses:
　　CHAS. H. SMITH,
　　GEO. D. WALKER.